SPAULDING & SCOTT.
Meat Chopper.
No. 48,734.
Patented July 11, 1865.
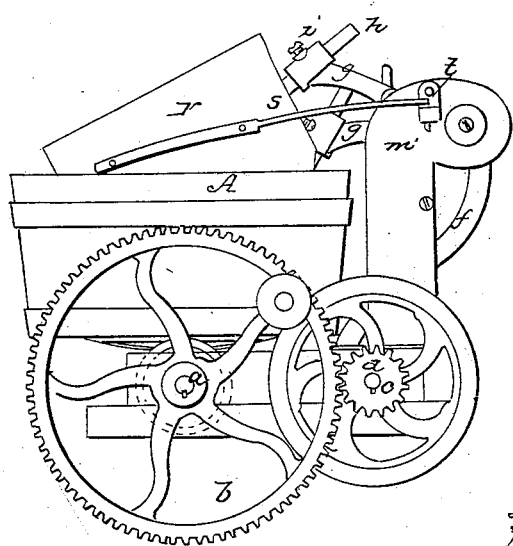
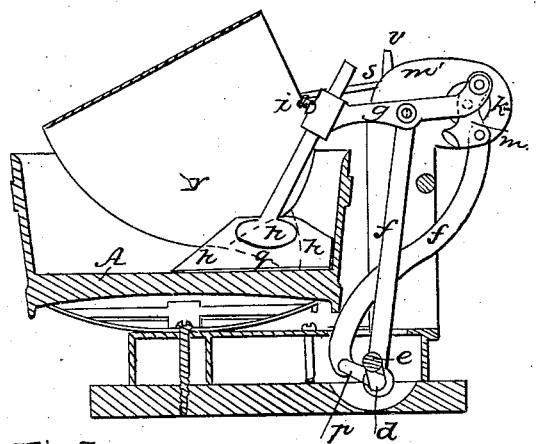
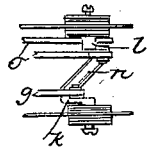
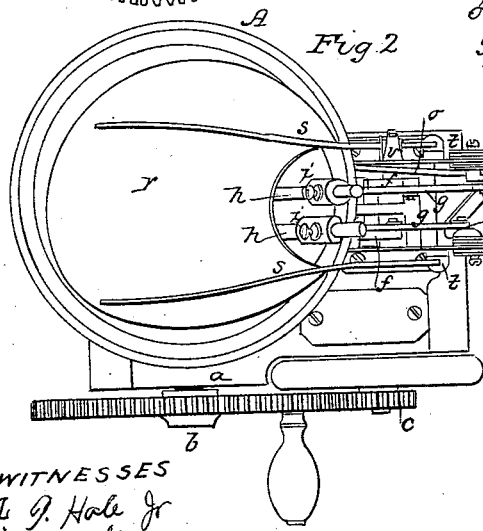
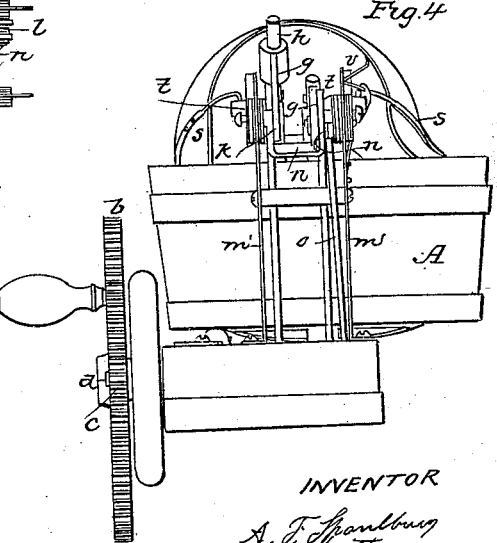

UNITED STATES PATENT OFFICE.

ALFRED F. SPAULDING AND SALMON M. SCOTT, OF WINCHENDON, MASS.

MEAT-CHOPPER.

Specification forming part of Letters Patent No. 48,734, dated July 11, 1865.

*To all whom it may concern:*

Be it known that we, ALFRED F. SPAULDING and SALMON M. SCOTT, of Winchendon, in the county of Worcester and State of Massachusetts, have invented an Improved Machine for Chopping Meat; and we do hereby declare the same to be fully described in the following specification and represented in the accompanying drawings, of which—

Figure 1 is a side elevation, Fig. 2 a top view, Fig. 3 a longitudinal section, and Fig. 4 a rear elevation, of it. Fig. 5 is a top view of the shaft $d$, to be hereinafter described.

In carrying out our invention we provide the rotary tub of the machine with a plow and a guard, by which the meat, while the tub may be in revolution and the knives are at work therein, will not only be turned over or plowed up, but be prevented from being thrown out of the tub by the knives, and we also combine with the mechanism for working the knives up and down in the tub a mechanism by which each of them, at, or about at, the termination of each downward stroke of it, shall be drawn backward a little in the tub, so as to insure its cutting through the meat.

In the drawings, A denotes a circular tub, which is to have suitable mechanism for revolving it with a slow movement, $a$ being the driving-shaft of such mechanism. The shaft $a$ carries a gear-wheel, $b$, which engages with a pinion, $c$, fixed on another shaft, $d$. This latter shaft has two bell-cranks, $e\ e$, from which connecting-rods $f\!f$ lead to and are jointed to two levers, $g\ g$, arranged as shown in the drawings. Each of these levers supports a chopping-knife, $h$, whose handle extends through the lever and is fastened or secured in place by a clamp-screw, $i$.

The tub, the knives, and the above-described mechanical devices for operating them are, or may be, substantially like others shown in Letters Patent No. 46,153, granted to us. We have, however, combined therewith certain other mechanism for producing a back draft or movement of each knife at, or about at, the termination of its downward movement.

Instead of the fulcra of the two levers $g\ g$ being a stationary pin we employ therefor a collection of cranks, $k\ l\ m$, movable on a projecting pin or common axis or axle. Two of these cranks—viz., $k\ l$—stand in opposite directions from this axis, while the other makes an obtuse angle with their common plane—that is, the arrangement of the three cranks is as shown in the drawings, their two journals being supported in posts $m'\ m'$. One of these levers $g\ g$ is jointed to each of the opposite cranks $k\ l$, and the crank $k$ is connected to the crank $m$ by a cross-bar, $n$. A connecting-rod, $o$, is jointed at its upper end to the crank $m$, and leads down to another crank, $p$, projecting from the shaft $d$. During the revolution of the said shaft $d$ not only will the two knives be caused to play up and down alternately, but through the action of the auxiliary mechanism $k\ l\ m\ p$ and the connecting-rod $o$ each of such knives will be drawn backward a little in the tub. In this way a highly advantageous compound movement of the knives will be produced. Each knife in going into the meat of the tub will cut with a drawing stroke, in addition to which it has a back-draft motion just as it about completes its downward motion. This peculiar action of it renders its operation on the meat very effective, particularly when the compression of the meat by the knife is the greatest. A plow, $q$, projecting from a curved plate or guard, $r$, extends into the tub and close against its bottom and interior curved surface. This plow turns the meat over toward the center of the tub while the tub revolves, the plow at such time being stationary in the tub. The guard so encompasses or goes over the knives as not only to arrest any meat which may be thrown up by them, but to cause it to drop back upon the mass in the tub. This guard is attached to two hooked arms, $s\ s$, which hook into shorter arms $t\ t$, which are hinged to the two posts $m\ m$, the same being so as to enable the guard to be turned into and out of the tub as occasion may require.

A spring-latch, $v$, by catching on one of the arms $s$ serves to hold the guard down in place when on the tub.

What we claim as our invention in the above-described meat-chopping machine is—

1. The combination of the four cranks $k\ l\ m$ $p$ and the connecting-rod $o$, or the mechanical equivalents thereof, with the remainder of the mechanism, or its equivalent, for operating the knives, the whole combination being productive of a compound motion of each knife, substantially as described.

2. The combination of the plow $q$, or the same and the guard $r$, with the rotary tub, and one or more knives provided with mechanism for moving such knife or knives up and down in the tub.

ALFRED F. SPAULDING.
SALMON M. SCOTT.

Witnesses:
ASAPH N. BROWN,
E. S. MERRILL.